(12) United States Patent
Hattix et al.

(10) Patent No.: US 11,301,636 B2
(45) Date of Patent: Apr. 12, 2022

(54) ANALYZING RESUMES AND HIGHLIGHTING NON-TRADITIONAL RESUMES

(71) Applicant: Microsoft Technology Licensing, LLC, Redmond, WA (US)

(72) Inventors: Carlos Lamont Hattix, Seattle, WA (US); Lin Sung Chiang, Issaquah, WA (US); Rachel Katheryn Hacker, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 50 days.

(21) Appl. No.: 16/400,772

(22) Filed: May 1, 2019

(65) Prior Publication Data
US 2020/0349227 A1    Nov. 5, 2020

(51) Int. Cl.
*G06F 40/30* (2020.01)
*G06F 40/242* (2020.01)
(Continued)

(52) U.S. Cl.
CPC ............ *G06F 40/30* (2020.01); *G06F 40/242* (2020.01); *G06F 40/279* (2020.01); *G06Q 10/1053* (2013.01)

(58) Field of Classification Search
CPC . G06F 3/16; G06F 3/162; G06F 3/165; G06F 3/167; G06F 16/60; G06F 16/61; G06F 16/632; G06F 16/634; G06F 16/635; G06F 16/636; G06F 16/637; G06F 16/638; G06F 16/639; G06F 16/64; G06F 40/30; G06F 40/35; G06F 40/40; G06F 40/205; G06F 40/211; G06F 40/216; G06F 40/221; G06F 40/226; G06F 40/237; G06F 40/242; G06F 40/247; G06F 40/268; G06F 40/279; G06F 40/284; G06F 40/289; G06F 40/295; G06F 17/245; G06F 17/277;
(Continued)

(56) References Cited

U.S. PATENT DOCUMENTS

2010/0114789 A1* 5/2010 Dane ...................... G06Q 10/06
                                                                   705/321
2013/0198599 A1* 8/2013 Kumar .................. G06F 17/245
                                                                   715/227
(Continued)

OTHER PUBLICATIONS

"65 HR and Recruiting Stats for 2018", Retrieved From: https://content.ebulletins.com/hubfs/C1/Glassdoor/65-hr-and-recruiting-stats-for-2018.pdf. Retrieved On: May 2, 2019, 18 Pages.
(Continued)

*Primary Examiner* — Leshui Zhang
(74) *Attorney, Agent, or Firm* — Michael Best & Friedrich LLP

(57) ABSTRACT

A system for analyzing resumes. The system includes an electronic computing device, including an electronic processor. The electronic processor is configured to receive a selection of a resume and determine a first set of terms included in both the resume and a sentiment dictionary. The sentiment dictionary includes a plurality of terms organized in a plurality of categories. The electronic processor is also configured to generate a visual representation of information included in the resume based on the first set of terms.

18 Claims, 6 Drawing Sheets

(51) Int. Cl.
*G06F 40/279* (2020.01)
*G06F 40/284* (2020.01)
*G06Q 10/10* (2012.01)

(58) Field of Classification Search
CPC ... G06F 17/2705; G06F 16/958; G06Q 10/00; G06Q 10/10; G06Q 10/1053; G06Q 10/06393; G06Q 10/06398; G06Q 50/01; H04L 51/046
USPC .......... 704/9, 10; 700/94; 705/321; 715/227; 707/736, 737, 738, 739, 740
See application file for complete search history.

(56) References Cited

U.S. PATENT DOCUMENTS

2014/0122355 A1  5/2014  Hardtke et al.
2017/0076219 A1* 3/2017  Byrnes ............... G06F 16/93
2017/0270484 A1* 9/2017  Cengiz .............. G06N 20/00
2018/0005163 A1* 1/2018  Ramo ............ G06Q 10/063112
                                              705/7.14

OTHER PUBLICATIONS

"Recruiting analytics: 5 ways to benchmark success", Retrieved from: http://www.staffing.org/documents/recruitingintelligence.pdf, Retrieved on: May 2, 2019, 22 Pages.

Severt, Natalie, "Top 99+ Recruiting and Hiring Stats HR Pros Must Know in 2018", Retrieved From: http://web.archive.org/web/20181105030946/https://zety.com/blog/hr-statistics, Sep. 27, 2018, 48 Pages.

"International Search Report and Written Opinion Issued in PCT Application No. PCT/US2020/026969", dated Jun. 2, 2020, 11 Pages.

* cited by examiner

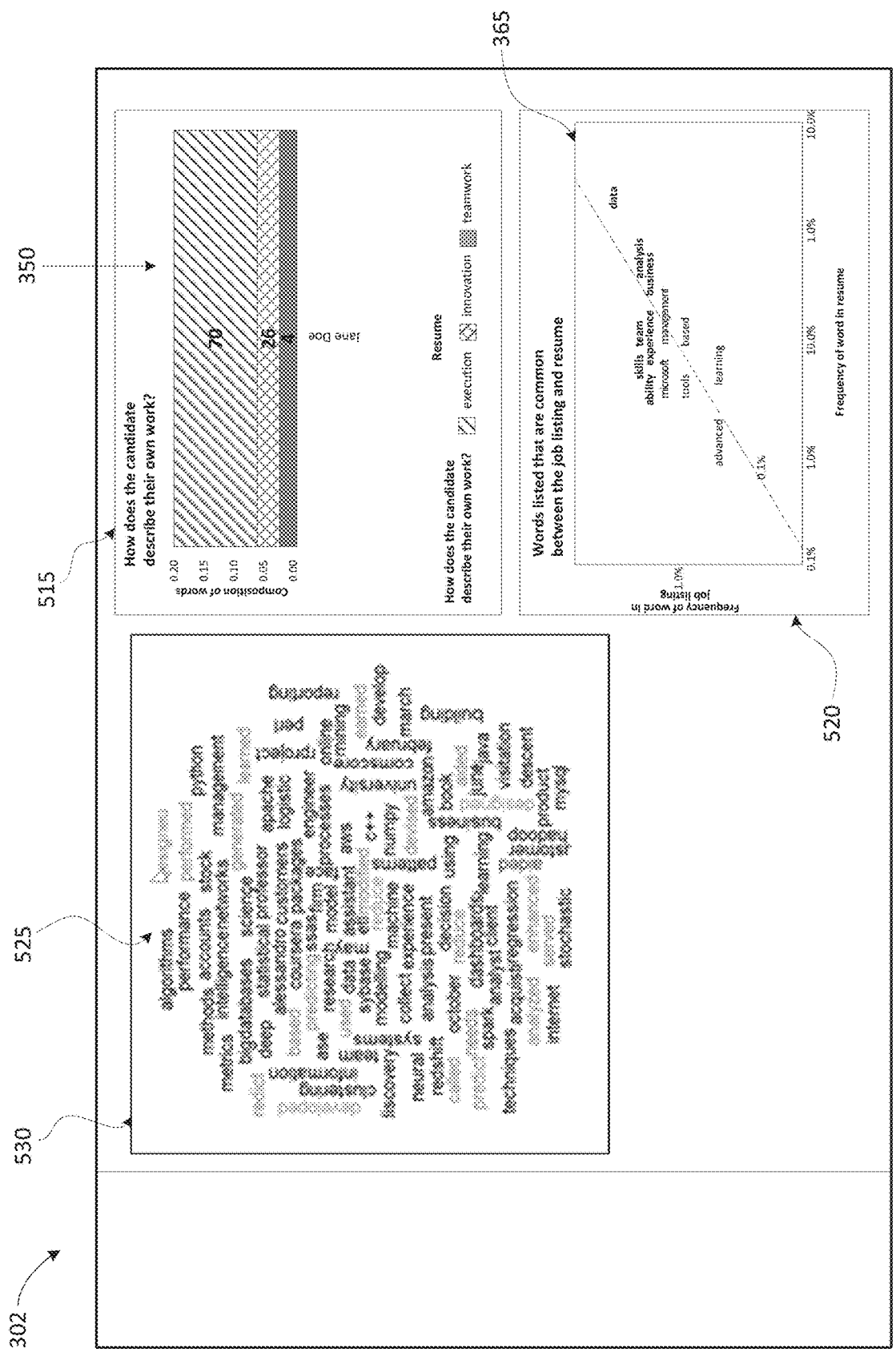

ANALYZING RESUMES AND HIGHLIGHTING NON-TRADITIONAL RESUMES

FIELD

Embodiments described herein relate to analyzing resumes and providing a user interface for easily reviewing a large number of resumes.

SUMMARY

Organizations receive hundreds and sometimes thousands of resumes for each job opening at the organization. It is generally unrealistic for human resources personnel to manually review hundreds of resumes every time a position at an organization needs to be filled. Additionally, human resources personnel may unknowingly be biased towards certain candidates, for example, candidates who attended a particular university, worked for a particular employer, or the like. Therefore, systems for reviewing resumes of prospective candidates for job openings have been created. Some existing systems for reviewing resumes match keywords included in a resume to keywords included in a job listing. However, matching keywords in job listings to keywords in resumes often does not recommend nontraditional resumes, in other words, resumes in which candidates did not include the keywords used in the job description. Thus, use of some existing systems may result in a resume review process that is biased towards certain groups of candidates. For example, a keyword-matching-system review process may be biased towards candidates similar to the author of the job description because, for example, those candidates and the author of the job description use the same vocabulary as a result, for example, of similar social upbringing and education. Additionally, some existing systems for analyzing resumes recommend resumes that include specific technical skills and experiences (for example, previous employers) but overlook resumes that highlight skills such as leadership and teamwork.

Embodiments described herein provide a system and method for analyzing resumes that help reduce bias and improve the identification of (or highlight) non-traditional resumes. The recommendation of non-traditional resumes is accomplished, in one example, through the utilization of a sentiment dictionary grouping a plurality of words into a plurality of categories. Embodiments herein also describe a user interface that allows a user (for example, human resources personnel) to easily review a large number of resumes and determine a group of candidates that are best suited for a job listing. The user interface includes, among other things, a word cloud and a bar graph.

For example, one embodiment provides a system for analyzing resumes. The system includes an electronic computing device, including an electronic processor. The electronic processor is configured to receive a selection of a resume and determine a first set of terms included in both the resume and a sentiment dictionary. The sentiment dictionary includes a plurality of terms organized in a plurality of categories. The electronic processor is also configured to generate a visual representation of information included in the resume based on the first set of terms.

Another embodiment provides a method of analyzing resumes. The method includes receiving a selection of a resume and determining a first set of terms included in both the resume and a sentiment dictionary. The sentiment dictionary includes a plurality of terms organized in a plurality of categories. The method also includes generating a visual representation of information included in the resume based on the first set of terms.

Yet a further embodiment provides a non-transitory computer-readable medium storing instructions that, when executed with an electronic processor, perform a set of functions. The set of functions includes receiving a selection of a resume and determining a first set of terms included in both the resume and a sentiment dictionary. The sentiment dictionary includes a plurality of terms organized in a plurality of categories. The set of functions also includes generating a visual representation of information included in the resume based on the first set of terms.

BRIEF DESCRIPTION OF THE DRAWINGS

FIGS. 3-6 are example user interfaces displaying visual representations of the resume analysis according to some embodiments.

DETAILED DESCRIPTION

Figure 1:
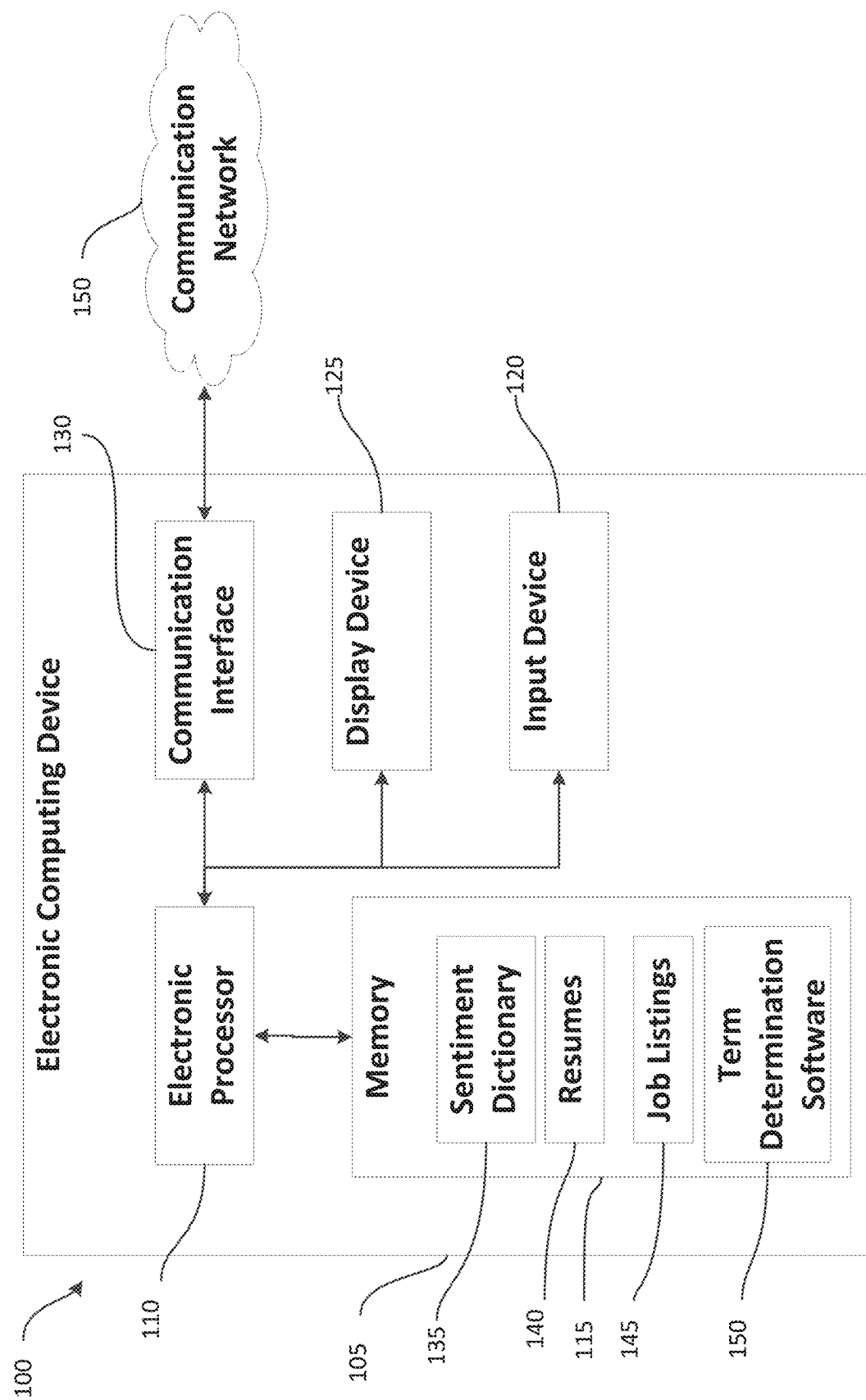
FIG. 1 schematically illustrates a system for analyzing resumes and highlighting non-traditional resumes according to some embodiments.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As noted above, there is a need for a reduced-bias system that reviews resumes and highlights non-traditional resumes. As also noted above, users such as human resources personnel do not have the time to review each resume received in response to a job listing. However, many existing systems for analyzing resumes only highlight or recommend resumes that list specific experience, technical skills, or both. Additionally, many existing systems for analyzing resumes match keywords in job listings to keywords in resumes. If there is bias in the wording of a job listing then the system will be biased with respect to the resumes it recommends. Thus, existing systems often overlook non-traditional candidates for roles and cause users searching for non-traditional candidates and un-biased results to analyze resumes manually, which increases the time needed to review resumes.

Accordingly, embodiments described herein provide a system and method for analyzing resumes that are not biased and highlight non-traditional resumes. More specifically, embodiments described herein use a sentiment dictionary to analyze resumes in addition to using desired technical skills and job listings. Thus, embodiments described herein help reduce the amount of time needed to review a large quantity of resumes.

FIG. 1 is a diagram of an example embodiment of a system 100 for analyzing resumes. The system 100 includes an electronic computing device 105. The electronic computing device 105 may be a laptop or desktop computer, a tablet computer, smart phone, or other computing device. In the illustrated embodiment, the electronic computing device 105 includes an electronic processor 110, a memory 115, an input device 120, a display device 125, and a communication interface 130. The electronic processor 110, memory 115, input device 120, display device 125, and communication interface 130 communicate over one or more communication lines or buses, wireless connections, or a combination thereof. It should be understood that, in various configurations, the electronic computing device 105 may include additional or alternative components than those illustrated in FIG. 1 and may perform additional functions than the functions described herein. For example, although only the input device 120 is shown, in some embodiments, the electronic computing device 105 includes multiple input devices, for example, a keypad, a mouse, a touchscreen (for example, as part of the display device 125), a microphone, a camera, or the like (not shown).

The electronic processor 110 may include one or more electronic processors (for example, microprocessors), application-specific integrated circuits (ASICs), or other suitable electronic devices. The memory 115 includes a non-transitory computer readable medium, for example, one or more of the types of memory noted above. The communication interface 130 is, for example, a transceiver, for communicating over the communication networks 155 and, optionally, one or more additional communication networks or connections. Portions of the communication networks 155 may be implemented using a wide area network, such as the Internet, a local area network, such as a Bluetooth™ network or Wi-Fi, and combinations or derivatives thereof.

The electronic processor 110 is electrically connected to and executes instructions stored in the memory 115. In the example illustrated in FIG. 1, the memory 115 stores a sentiment dictionary 135, one or more resumes 140, one or more job listings 145, and term determination software 150. The sentiment dictionary 135 includes a plurality of terms, each grouped into one or more categories of a plurality of categories. In some embodiments the plurality of categories include the categories innovation, execution, leadership, and teamwork. Each term in the sentiment dictionary 135 belongs to at least one category and may belong to more than one category. For example, the term "aided" may be included in the category execution and the category teamwork. The sentiment dictionary 135 may be unchanging or updated periodically. Additionally, in some embodiments the sentiment dictionary 135 is created and updated using crowd sourcing techniques to ensure that the sentiment dictionary 135 is unbiased. It should be understood that, in some embodiments, the sentiment dictionary 135 may be stored in the memory of a remote server connected to the electronic computing device 105 via the communications network 155 rather than the memory 115 of the electronic computing device 105.

The one or more resumes 140 may be PDF documents organized into one or more folders. For example, the one or more resumes may be organized into one or more folders, each folder representing a job listing. In some embodiments, the one or more resumes 140 are received by the electronic processor 110 via a wired or wireless communications network 155. For example, the electronic processor 110 may receive the one or more resumes 140 from a scanner or a remote server connected to the electronic computing device 105 via the communications network 155. In some embodiments, like the one or more resumes 140, the one or more job listings 145 are PDF documents. The one or more job listings 145 each include at least a description of a job. In some embodiments, the electronic processor 110 receives the one or more job listings 145 from a remote server via the communications network 155. The term determination software 150, when executed by the electronic processor 110 utilizes optical character recognition to parse PDF documents (in this case the one or more resumes 140 and the one or more job listings 145) to determine words included in the documents. In some embodiments, the term determination software 150 includes computer executable instructions that when performed by the electronic processor 110 perform tf-idf (term frequency and inverse document frequency), to select terms from the resume. Performing tf-idf allows relevant terms (as opposed to every term) included in a resume to be selected. For example, when using tf-idf, the electronic processor 110 does not select the terms "the", "a", and "and" due to the high frequency of usage of those terms in the English language.

It should be noted that, in some embodiments, the functionality described herein as being performed by the electronic computing device 105 may be performed by an electronic computing device (for example, a server) connected to the electronic computing device 105 via the communications network 155.

Figure 2:
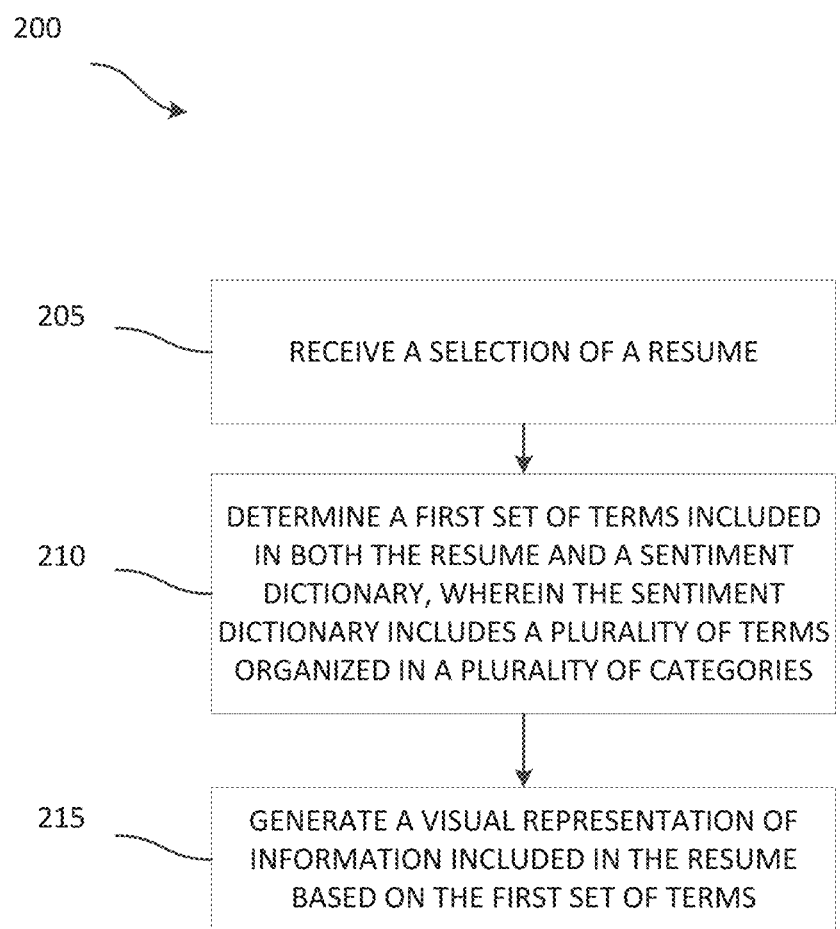
FIG. 2 is a flowchart illustrating of a method of analyzing resumes and highlighting non-traditional resumes according to some embodiments

FIG. 2 is a flowchart of an example method 200 for analyzing resumes. The electronic processor 110 receives a selection of a plurality resumes (for example, a selection of a folder including a plurality of resumes) of the one or more resumes 140 and a job listing from the one or more job listings 145, via the input device 120. At step 205, the electronic processor 110 receives a selection of a resume, causing the electronic processor 110 to retrieve the selected resume. In some embodiments, the electronic processor 110 may receive the selection of the resume from the plurality of resumes via the input device 120. For example, the electronic processor 110 may receive a name of a candidate associated with a resume as a selection of the resume. At step 210, the electronic processor 110 determines a first set of terms included in the resume and the sentiment dictionary 135. To determine the first set of terms included in the resume and the sentiment dictionary 135, the electronic processor 110 executes the term determination software 150 to select one or more terms included in the resume and determines the number of times each term occurs in the resume. The electronic processor 110 searches the sentiment dictionary 135 to determine, for each of the terms selected from the resume, whether the term corresponds to a term included in the sentiment dictionary 135. When the term is included in the sentiment dictionary 135, the electronic processor 110 determines a category or categories to which the term belongs. The electronic processor 110 stores in the memory 115 the first set of terms, and, for each term included in the first set of terms, the number of times the term occurs in the resume. The electronic processor 110 also stores the categories of the sentiment dictionary 135 that include the term (or in which the term belongs). It should be understood that while the above functionality is described as being performed for a single resume it may be performed for multiple resumes (using, for example, batch processing) when a selection of multiple resumes is received by the electronic processor 110 at step 205.

At step 215, the electronic processor 110, generates a visual representation of information included in the resume based on the first set of terms. The types of visual representations that the electronic processor 110 may generate are described in further detail below.

Figure 3:
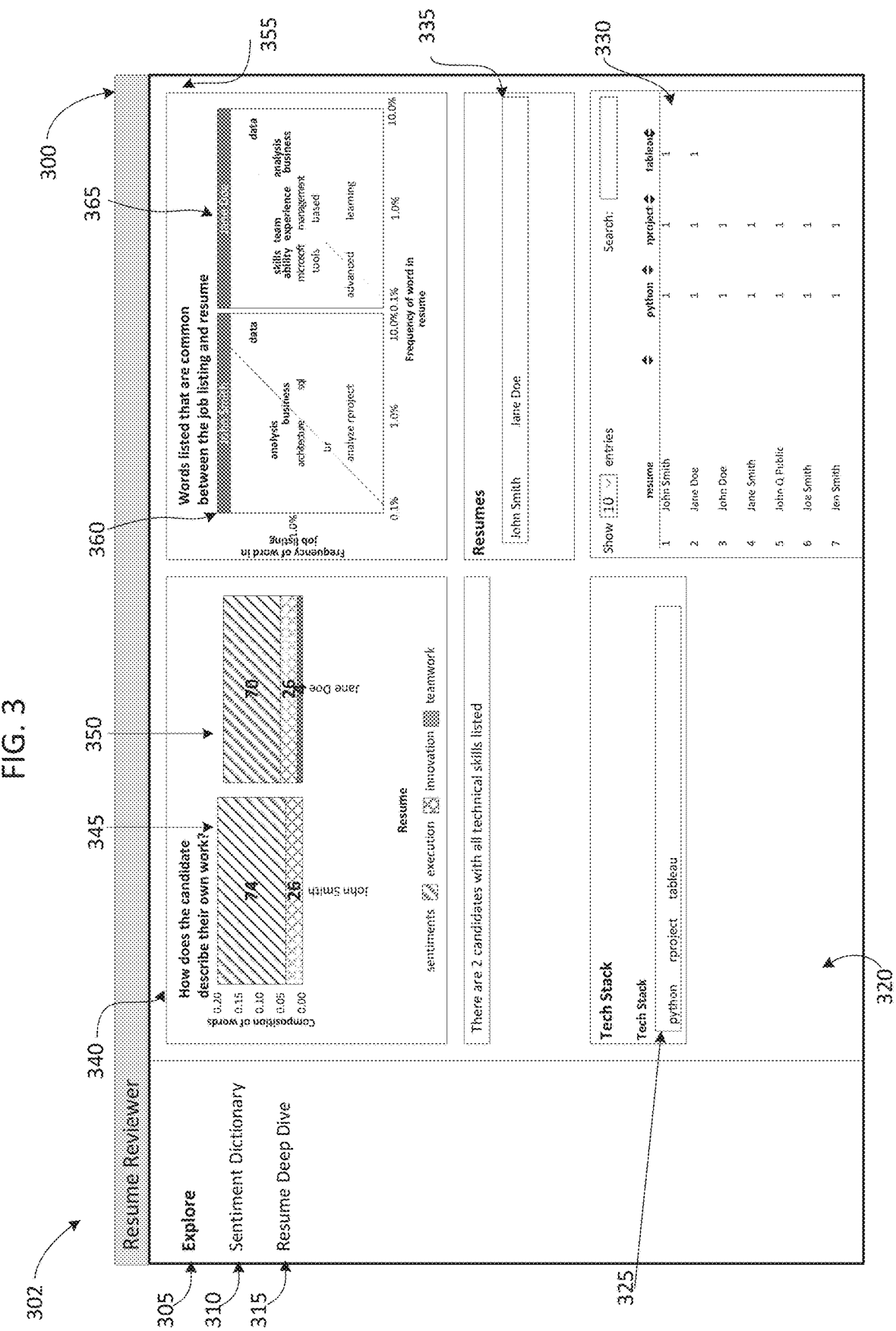

FIG. 3 illustrates an example window 300 of a graphical use interface 302 displayed on the display device 125. A user interacts with the graphical user interface 302 as the electronic processor 110 executes the method 200. In the example illustrated in FIG. 3, the window 300 includes a plurality of tabs (an explore tab 305, a sentiment dictionary tab 310, and a resume deep dive tab 315), each of which, when selected, cause the electronic processor 110 to display a different panel on the display device 125. These panels are described in further detail below. It should be understood that the window 300 may include a different number of tabs than the three tabs illustrated in FIG. 3 and that another graphical user interface element (for example, a drop down menu) may be used instead of or in combination with the plurality of tabs illustrated in FIG. 3.

In the illustrated example, when the electronic processor 110 receives a selection of the explore tab 305, the electronic processor 110 displays an explore panel 320. In some embodiments, the electronic processor 110 receives a selection of one or more technical skills in the tech stack search field 325 via the input device 120, and generates a tabular visual representation (for example, a table included in sub-panel 330 of the explore panel 320 of FIG. 3) of candidates whose resumes include one or more of the selected technical skills. For example, in FIG. 3, the tech stack search field 325 includes the keywords (technical skills) Python™, rproject, and Tableau®. Resumes (represented by candidate name) that includes at least one of the technical skills are displayed in the sub-panel 330 along with an indication of which of the selected technical skills the resumes include. For example, in the sub-panel 330, a "1" placed in a column associated with a technical skill and a row associated with a resume indicates that the resume includes the technical skill. In FIG. 3, the sub-panel 330 shows that John Smith and Jane Doe's resumes mention Python™, rproject, and Tableau®, while, for example, John Doe's resume only mentions Python™ and rproject. In some embodiments, the electronic processor 110 determines which resumes include one or more of the selected technical skills using the term determination software 150 to search each resume of the selected plurality of resumes for terms in the resume that correspond to one of the selected technical skills. It should be understood that, in some embodiments, the electronic processor 110 takes into account the context in which a term is used in a resume when determining whether a resume includes a selected technical skill. For example, when one resume states "I have a pet python" and another resume states "I have experience programming in python," the electronic processor 110 determines that only the resume stating "I have experience programming in python" includes the technical skill Python™. As a consequence, the sub-panel 330, lists Python™ as a technical skill included in the resume stating "I have experience programming in python" but does not list Python™ as a technical skill included in the resume stating "I have a pet python." In some embodiments, the electronic processor 110 determines the context of the term using machine learning techniques (for example, a recurrent neural network (RNN)).

A user may use the data displayed in the sub-panel 330 to select a resume to view on a display, for example, display device 125. In the example illustrated in FIG. 3, the electronic processor 110 receives a selection of two resumes when a user enters the names John Smith and Jane Doe to the resume search field 335. When the electronic processor 110 receives the names John Smith and Jane Doe, the electronic processor 110 retrieves a resume with the name John Smith and a resume with the name Jane Doe. It should be understood that the electronic processor 110 may receive a selection of a different number of resumes when a different number of names than the two names illustrated in FIG. 3 are entered into the resume search field 335. As described above in relation to steps 210 and 215 of the method 200, the electronic processor 110 generates a visualization of the selected resumes.

For example, the electronic processor 110 may generate a word cloud, a bar graph, or both as a visual representation of information included in the resume. In some embodiments, a bar graph visualization of information included in a resume includes a representation of how many terms are included in the first set of terms. For example, the height of the bar in the bar graph visualization represents how many terms are included in a resume that are also included in the sentiment dictionary 135. The height of the bar graph is a representation of the variety of terms used in the resume. The greater the height of the bar the greater the variety of vocabulary used in the resume. The bar graph visualization of a resume may also include, for each category included in the sentiment dictionary 135, a representation of the number terms included in the resume also belonging to the category. For example, the bar included in the bar graph visualization may be broken into multiple vertically adjacent sections, each section representing a category included in the sentiment dictionary 135 and represented by, for example, a color or pattern. The height of the section may represent how many terms are included in the resume belonging to the category represented by the section. In some embodiments, when the first set of terms does not include a term belonging to a category, that category is not represented in the bar graph visualization. In some embodiments, when a term belongs to more than one category included in the sentiment dictionary 135 the term is represented in each category it belongs to in the bar chart visualization. It should be noted that if a selection of multiple resumes is received by the electronic processor 110, the electronic processor 110 generates bar graph visualizations for each selected resume. In some embodiments, the generated bar graph visualizations are displayed adjacent to one another, via the display device 125.

FIG. 3 illustrates example bar graph visualizations of information included in John Smith and Jane Doe's resumes (the selected resumes) in a sub-panel 340. Bar graph visualization 345 illustrates that John Smith's resume is 20 percent comprised of words included in the sentiment dictionary 135 and includes words belonging to the categories execution and innovation. Specifically, 74 words in John Smith's resume belong to the category execution (represented by, for example, a red or striped section of the bar graph visualization 345) and 26 words belong to the category innovation (represented by, for example, the green or diamond patterned section of the bar graph visualization 345). Bar graph visualization 350 illustrates that Jane Doe's resume is 17 percent comprised of words included in the sentiment dictionary 135 and includes words belonging to the categories execution, innovation, and teamwork. Specifically, 70 words in Jane Doe's resume belong to the category execution (represented by, for example, a red or striped section of the bar graph visualization 350), 26 words belong to the category innovation (represented by, for example, a green or diamond patterned section of the bar graph visualization 350), and 4 words belong to the category teamwork (represented by, for example, a blue or solid section of the bar graph visualization 350).

Figure 4:
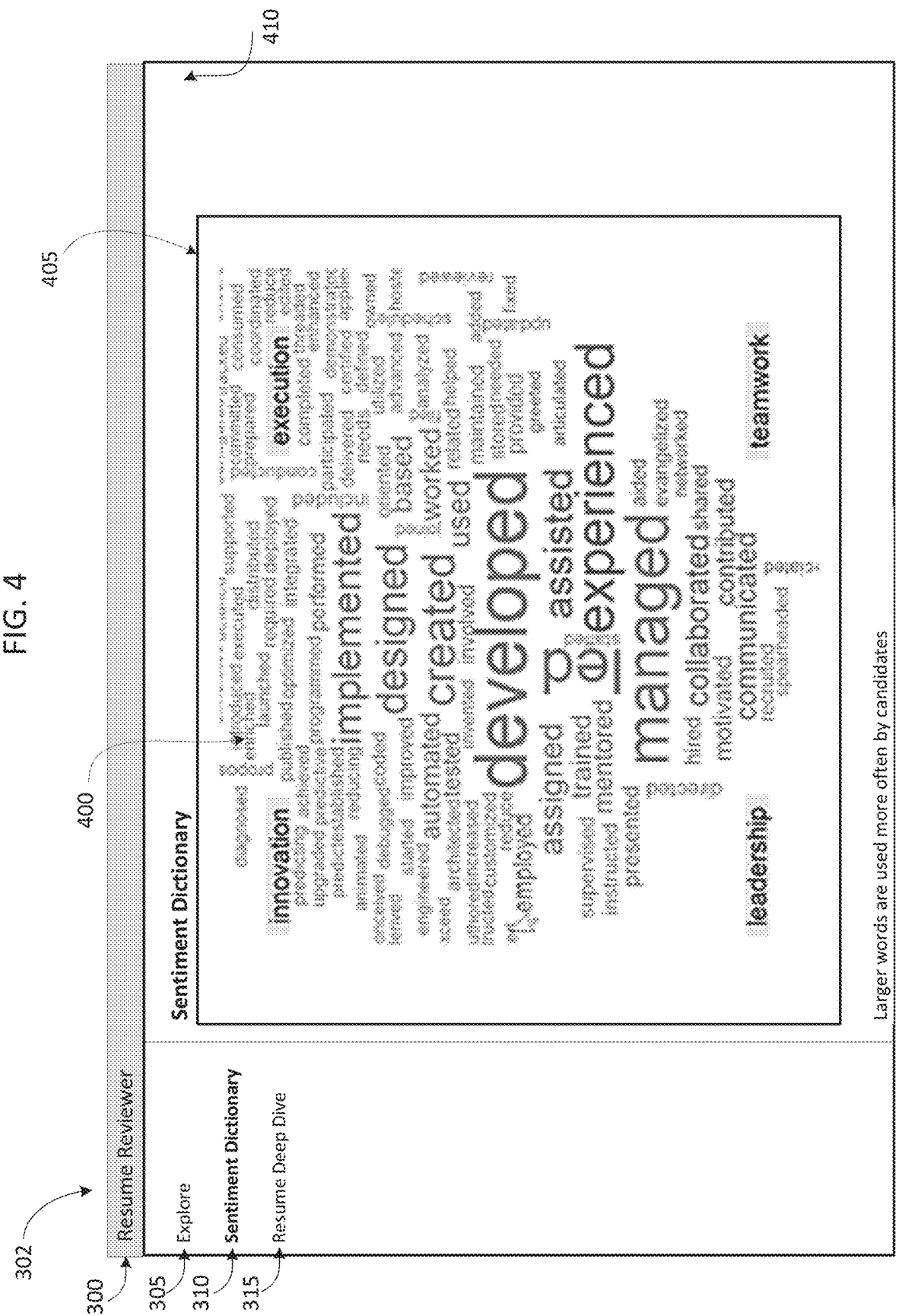

In some embodiments, a word cloud includes each word included in a plurality of resumes and the sentiment dictionary 135 (a third set of terms). For each word included in the word cloud, the size of the word in the word cloud may be an indication of how many times the word is included in the plurality of resumes and the color of the word or the shade of the word in gray scale may be an indication of the category in the sentiment dictionary 135 that the word belongs to. In some embodiments, if a term belongs to multiple categories in the sentiment dictionary 135, the term is illustrated in the word cloud multiple times, once for each category that the term is included in. FIG. 4 illustrates a word cloud 400 generated for a plurality of resumes. The word cloud 400 may be displayed in a sub-panel 405 when the electronic processor 110 receives a selection of the sentiment dictionary tab 310 and a sentiment dictionary panel 410 is displayed on the display device 125. In the word cloud 400 the term "developed" is the term that occurs the most often in a plurality of resumes. The term "developed" belongs to the category innovation in the sentiment dictionary 135.

In other embodiments, a word cloud includes each relevant term included in a single resume. Relevant terms may be selected from the resume by the electronic processor 110 executing the term determination software 150 as described above in relation to determining the first set of terms. In this example, the color of a term or shade of the word in gray scale in the word cloud is an indication of whether the term is included in the sentiment dictionary 135 and which category or categories the term belongs to. An example of this type of word cloud is illustrated in FIG. 6 and described below.

As mentioned above in the description of FIG. 2, in some embodiments the electronic processor 110 receives a selection of a job listing causing the electronic processor 110 to retrieve a job listing including a description of the job. When the electronic processor 110 retrieves a job listing, the electronic processor 110 may determine a second set of terms included in the selected resume and the job description using the term determination software 150. For example, the term determination software 150 selects a plurality of terms from the selected resume and the number of times each term occurs in the selected resume. For each term of the plurality of terms selected from the resume, the electronic processor 110 searches the job description for a corresponding term. When a corresponding term is found in the job description, the electronic processor 110 may add the term to the second set and determine the number of times the term occurs in the job description. Once the second set of terms is determined, the electronic processor 110 may generate a visual representation of information included in the resume using the second set of terms included in the job description and the resume. In one example, the visual representation of information included in the resume created using the second set of terms is a scatter plot. The scatter plot includes, for each term included in the second set, a number of times the term appears in the resume and a number of times the term appears in the job description. For example, the number of times a term is mentioned in a resume is plotted on the x-axis of the scatter plot and the number of times that a term is mentioned in a job description is plotted on the y-axis of the scatter plot. It should be noted that if a selection of multiple resumes is received by the electronic processor 110, then in a manner similar to that described above in relation to the bar graph visualization, the electronic processor 110 generates scatter plots for each selected resume and the generated scatter plots are displayed adjacent to one another, via the display device 125.

FIG. 3 illustrates two example scatter plots generated for John Smith and Jane Doe's resumes and included in a sub-panel 355. Scatter plot 360 compares the frequency that terms included in John Smith's resume and the job description are included in John Smith's resume compared to the job description. For example, about 1 percent of the words included in John Smith's are the term "business" and about 1 percent of the words included in the job description are the term "business." Scatter plot 365 compares the frequency that terms included in Jane Doe's resume and the job description are included in Jane Doe's resume compared to the job description. For example, about 1 percent of the words included in John Smith's resume are the term "learning" and about 0.25 percent of the words included in the job description are the term "learning."

Figure 5:
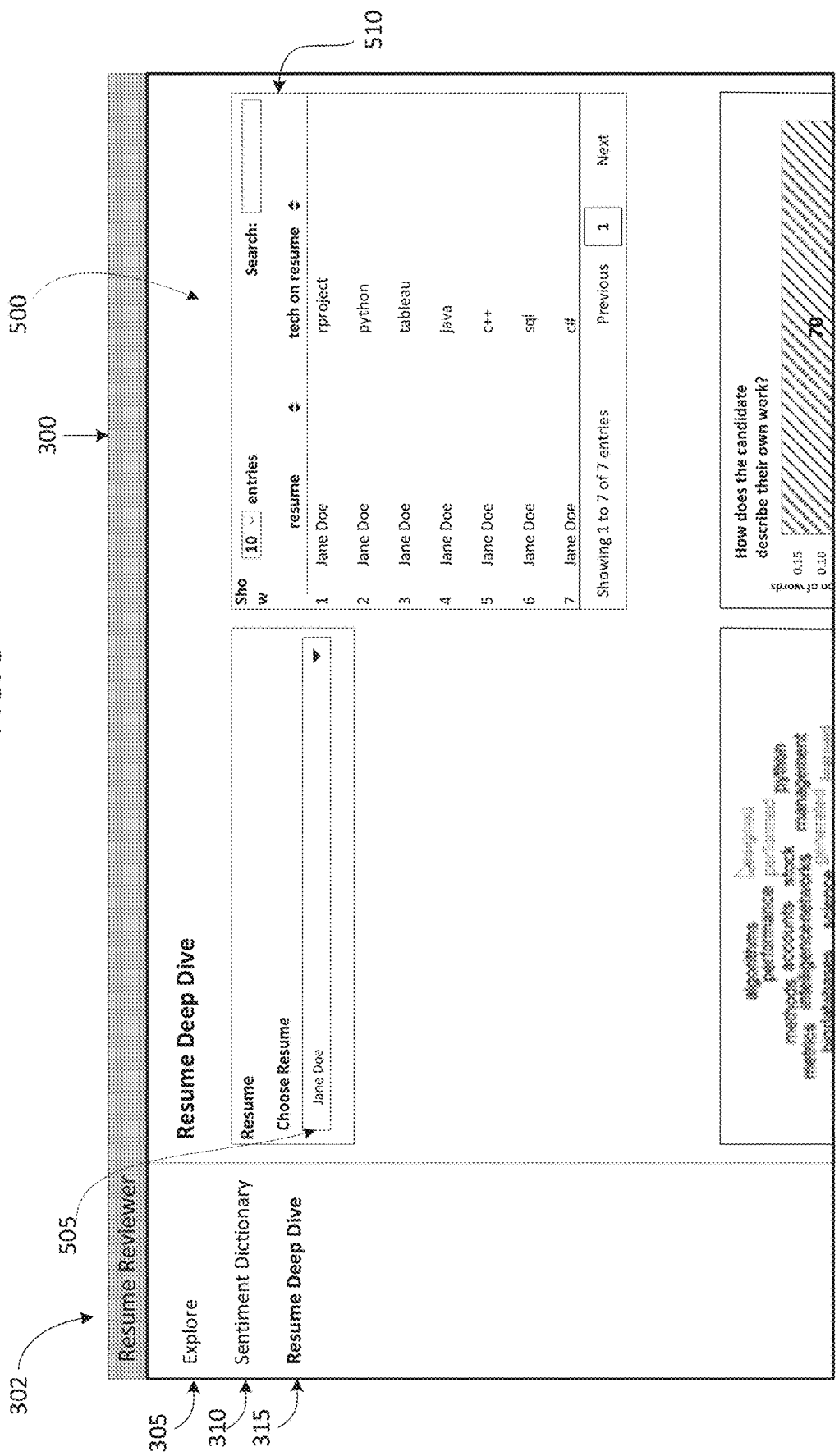

In some embodiments, when the electronic processor 110 receives a selection of the resume deep dive tab 315, a resume deep dive panel 500 illustrated in FIG. 5 is displayed via the display device 125. The resume deep dive panel 500 allows a user to examine a single resume in detail. For example, as described above, when a candidate name is entered into the search field 505, the electronic processor 110 retrieves a resume having that name and generates a plurality of visualizations for the selected resume. In the example embodiment illustrated in FIG. 5, the electronic processor 110 receives a selection of Jane Doe's resume and generates a tabular visual representation of Jane Doe's resume in sub-panel 510. Sub-panel 510 includes a table listing each technical skill of a plurality of technical skills included in Jane Doe's resume. In the illustrated embodiment the technical skills listed on Jane Doe's resume include rproject, Python™, Tableau®, Java™, C++, SQL, and C #.

FIG. 6 illustrates additional example visualizations of Jane Doe's resume included in the resume deep dive panel 500. It should be understood that FIG. 5 and FIG. 6 both illustrate the resume deep dive panel 500 but FIG. 5 and FIG. 6 illustrate different portions of the resume deep dive panel 500. The electronic processor 110 may display different portions of the resume deep dive panel 500 on the display device 125 in response to receiving input from the input device 120. For example, when the input device 120 is a mouse, the portion of the resume deep dive panel 500 illustrated in FIG. 5 is displayed on the display device 125, and the electronic processor 110 receives a signal from the mouse (or cursor control mechanism) indicative of a downward scrolling motion, the display device 125 displays the portion of the resume deep dive panel 500 illustrated in FIG. 6 in place of the portion of the resume deep dive panel 500 illustrated in FIG. 5. FIG. 6 illustrates the bar graph visualization 350 included in sub-panel 515, the scatter plot 365 included in sub-panel 520, and a word cloud 525 included in sub-panel 530. In the word cloud 525, each term selected by the electronic processor 110 from Jane Doe's resume is illustrated. The color of a term or shade of the term in grayscale indicates whether the term is included in the sentiment dictionary 135 and, when the term is included in the sentiment dictionary 135 which category or categories in the sentiment dictionary 135 the term belongs to. For example, in the word cloud 525 the term "analyst" is in black indicating that the term "analyst" is included in Jane Doe's resume but is not included in the sentiment dictionary 135, while the term "aided" is a shade of gray or a color, for example, purple indicating that the term "aided" is included in Jane Doe's resume and the sentiment dictionary 135 in the category teamwork.

Various features and advantages of some embodiments are set forth in the following claims.

What is claimed is:

1. A system for analyzing resumes, the system comprising:
   an electronic computing device, including an electronic processor, the electronic processor configured to:
   receive a selection of a resume;
   determine a first set of terms included in both the resume and a sentiment dictionary, wherein the sentiment dictionary includes a plurality of terms organized in a plurality of categories; and
   generate a visual representation of information included in the resume based on the first set of terms, wherein the visual representation includes a representation of a quantity of terms within the resume and included in the first set of terms that belong to each of the plurality of categories.

2. The system according to claim 1, wherein the visual representation includes a bar graph or a word cloud.

3. The system according to claim 2, wherein the word cloud includes the first set of terms and, for each term in the first set of terms, an indication of a category of the plurality of categories to which the term belongs.

4. The system according to claim 3, wherein the word cloud includes one or more terms included in the resume but not included in the sentiment dictionary and an indication of which terms are not included in the sentiment dictionary.

5. The system according to claim 1, wherein the electronic processor is further configured to:
   retrieve a job description;
   determine a second set of terms included in both the job description and the resume; and
   generate a visual representation of information included in the resume using the second set of terms included in the job description and the resume, for each term included in the second set, a number of times the term appears in the resume and a number of times the term appears in the job description.

6. The system according to claim 1, wherein the electronic processor is further configured to:
   receive one or more keywords; and
   determine, from a plurality of resumes, resumes including a keyword of the one or more keywords.

7. The system according to claim 1, wherein the electronic processor is further configured to:
   receive a selection of a plurality of resumes;
   determine a third set of terms included in the one or more of the plurality of resumes; and
   generate a word cloud based on the third set of terms, wherein the word cloud includes each term included in the third set of terms and, for each term in the third set of terms, a category of the plurality of categories to which the term belongs and how many times the term appears in the plurality of resumes.

8. The system according to claim 1, wherein the electronic processor is configured to:
   display a window including a plurality of tabs;
   receive a selection of a tab from the plurality of tabs; and
   display a panel based on the selected tab.

9. The system according to claim 1, wherein one or more adjustable characteristics of the visual representation is adjusted based on determining a term in the plurality of terms is not included in the sentiment dictionary.

10. The system according to claim 1, wherein each term in the sentiment dictionary belongs to at least one category of the plurality of categories.

11. A method of analyzing resumes, the method comprising:
    receiving a selection of a resume;
    determining a first set of terms included in both the resume and a sentiment dictionary, wherein the sentiment dictionary includes a plurality of terms organized in a plurality of categories; and
    generating a visual representation of information included in the resume based on the first set of terms, wherein the visual representation includes a representation of a quantity of terms within the resume and included in the first set of terms that belong to each of the plurality of categories.

12. The method according to claim 11, wherein the visual representation includes a bar graph or a word cloud.

13. The method according to claim 12, wherein the word cloud includes the first set of terms and, for each term in the first set of terms, an indication of a category of the plurality of categories to which the term belongs.

14. The method according to claim 11, the method further comprising:
    displaying a window including a plurality of tabs;
    receiving a selection of a tab from the plurality of tabs; and
    displaying a panel based on the selected tab.

15. A non-transitory computer-readable medium storing instructions that, when executed with an electronic processor, perform a set of functions, the set of functions comprising:

receiving a selection of a resume;

determining a first set of terms included in both the resume and a sentiment dictionary, wherein the sentiment dictionary includes a plurality of terms organized in a plurality of categories; and generating a visual representation of information included in the resume based on the first set of terms, wherein the visual representation includes a representation of a quantity of terms within the resume and included in the first set of terms that belong to each of the plurality of categories.

16. The non-transitory computer-readable medium according to claim 15, wherein the visual representation includes a bar graph or a word cloud.

17. The non-transitory computer-readable medium according to claim 16, wherein the word cloud includes the first set of terms and, for each term in the first set of terms, an indication of a category of the plurality of categories to which the term belongs.

18. The non-transitory computer-readable medium according to claim 16, the functions further comprising:

displaying a window including a plurality of tabs;

receiving a selection of a tab from the plurality of tabs; and displaying a panel based on the selected tab.

* * * * *